2,778,817
POLYAZO DYESTUFFS

Philippe Grandjean, Basel, Switzerland, assignor, by mesne assignments, to Saul & Co., Newark, N. J., as nominee of Fidelity Union Trust Company, trustee No Drawing. Application December 13, 1954,
Serial No. 474,990

Claims priority, application Switzerland
December 24, 1953

7 Claims. (Cl. 260—173)

This invention relates to polyazo dyestuffs. According to the present invention, valuable new polyazo dyestuffs are obtained when 1 mol of an aminobenzoylaminodisazo compound of the formula

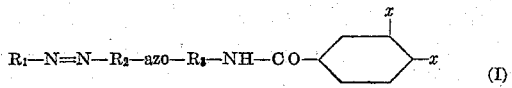

(I)

wherein $R_1$ and $R_2$ represent radicals of the benzene or naphthalene series free from hydroxy, nitro and amino groups and which together contain at least two sulfonic acid groups, $R_3$ is a radical of the benzene series free from hydroxy, nitro and amino groups, one $x$ is an amino group, the other $x$ being an atom of hydrogen or a halogen or an alkyl or an alkoxy group, and the —azo— group is in para-position to the —N=N— group as well as to the —NH—CO— group, is diazotized, and the diazo compound is coupled with 1 mol of a hydroxynaphthalene-sulfonic acid which may contain an acylamino group, preferably with 1 mol of a 2-acylamino-5-hydroxy-naphthalene-7-sulfonic acid or a 2-acylamino-8-hydroxy-naphthalene-6-sulfonic acid.

The aminobenzoylaminodisazo compounds of Formula I may be prepared by condensing an aminodisazo compound of the composition $$R_1—N=N—R_2—N=N—R_3—NH_2 \quad (II)$$

wherein $R_1$, $R_2$ and $R_3$ have the meanings hereinbefore given and the two —N=N— groups are para-positioned, with a nitrobenzenecarboxylic acid halide of the formula

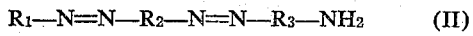

(III)

wherein one $y$ represents the nitro group and the other $y$ represents an atom of hydrogen or of a halogen, or an alkyl or alkoxy group, and $z$ represents a halogen atom, and reducing the nitro group of the condensation product to the amino group. The aminodisazo compounds of Formula II may be obtained, for example, by coupling the diazo compound of a sulfonated amine of formula $R_1$—$NH_2$ with an optionally sulfonated amine of formula $R_2$—$NH_2$ which couples in para-position to the amino group, diazotizing the resulting aminomonoazo compound and coupling the diazo compound with an amine of formula $R_3$—$NH_2$ which couples in para-position to the amino group. In this case also the symbols $R_1$, $R_2$ and $R_3$ have the meanings given above.

The new polyazo dyestuffs of the present invention conform to the general formula

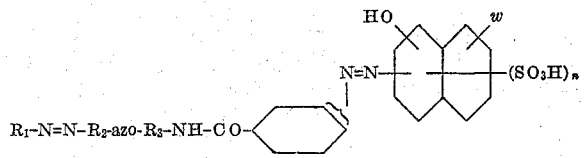

wherein $R_1$, $R_2$ and $R_3$ have the meanings given above, $w$ represents a hydrogen atom or an acylamino group, $n$ is 1 or 2, and the —azo— group is in para-position to the —N=N— group as well as to the —NH—CO— group.

Specially valuable new polyazo dyestuffs are those which correspond to the general formula

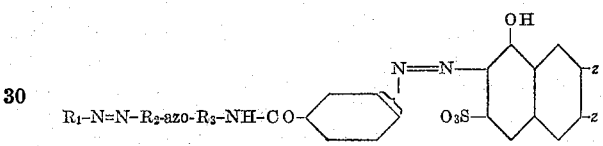

wherein $R_1$, $R_2$, $R_3$ and —azo— have the meanings given above, and one of the substituents $z$ represents a hydrogen atom and the other an —NH-acyl group, where acyl represents the radical of a carboxylic acid.

Suitable amines of the formula $R_1$—$NH_2$ serving for the production of the aminodisazo compounds (II) according to the above process are, for example, aminobenzene-mono- and -disulfonic acids, aminomethylbenzenesulfonic acids, aminohalogenbenzenesulfonic acids and aminonaphthalenemono- and disulfonic acids. Representative of the $R_2$—$NH_2$ amines are, for example, 1-amino-2- or -3-methylbenzene, 1-amino-2,5-dimethylbenzene, 1-amino-2- or -3-methoxybenzene, 1-amino-2-methoxy-5-methylbenzene, 1-amino-2,5-dimethoxy- or diethoxybenzene, 1-amino-3-acetylaminobenzene, 1-aminonaphthalene and 1-aminonaphthalene-6- or -7-sulfonic acid. Finally, as illustrative of the $R_3$—$NH_2$ amines there are mentioned, by way of example, the aminobenzenes listed under $R_2$—$NH_2$. Very valuable aminodisazo compounds (II) are also obtained by diazotizing an aminobenzene disulfonic acid, for example 4-amino-1,1'-azobenzene-3,4'-disulfonic acid, and coupling the diazo compound with one of the above defined amines of the formula $R_3$—$NH_2$.

A large number of nitrobenzene carboxylic acid halides (III) are suitable for condensation with the aminodisazo compounds (II). These include 3- or 4-nitrobenzoyl chloride, 3-nitro-4-methoxybenzoyl chloride, 3-methyl-4-nitrobenzoyl chloride, 3-chloro- or -bromo-4-nitrobenzoyl chloride and the corresponding benzoyl bromides, etc.

Representative of the hydroxynaphthalenesulfonic acids, some of which have an acylamino group, are 1-hydroxynaphthalene-3- or -4-sulfonic acid or -3,6-disulfonic acid, 2-hydroxynaphthalene-4- or -6- or -8-sulfonic acid or -6,8-disulfonic acid, 1-acetylamino- or -benzoylamino-5-hydroxynaphthalene - 7 - sulfonic acid, 1-acetylamino- or -benzoylamino-8-hydroxynaphthalene-3,6-disulfonic acid, etc. Preferred species are 2-acetylamino- or -propionylamino- or -crotonylamino- or -benzoylamino- or -cinnamoylamino-5-hydroxynaphthalene-7-sulfonic acid and the corresponding 2-amino-8-hydroxynaphthalene-6-sulfonic acids, 2-(3'- or -4'-amino)- or -(3'-methyl-4'-amino)- or -(3'-amino-4'-methoxy)-benzoylamino-5-hydroxynaphthalene-7-sulfonic acid and the corresponding 2-amino-8-hydroxynaphthalene-6-sulfonic acids, 2-carbomethoxyamino- or -carbethoxyamino- or -carbopropoxyamino- or -carbobutoxyamino- or -carbo-(2'-ethoxy)-ethoxyamino-5-hydroxynaphthalene-7-sulfonic acid and the corresponding 2-amino-8-hydroxynaphthalene-6-sulfonic acids and finally 5-hydroxy-7-sulfonaphthalene-2-carbamic acid-(4'-acetylamino)-phenylamide.

The new polyazo dyestuffs according to the invention dye cotton and fibers of regenerated cellulose in orange, red to reddish-brown, light-fast and dischargeable shades. If the azo components possess a primary amino group they may be diazotized on the fiber and coupled with suitable azo components such as 2-hydroxynaphthalene. Through such an after-treatment the fastness to water as well as to washing of the dyeings is considerably increased.

The following examples illustrate the invention in non-limitative manner. The parts given are by weight, the percentages are by weight and the temperatures are in degrees centigrade.

between 6 and 7. Coupling takes place very quickly; the solution containing the formed trisazo dyestuff completely dissolved therein is then heated to 70°, and the dyestuff is salted out, filtered and dried.

The new dyestuff corresponds to the formula

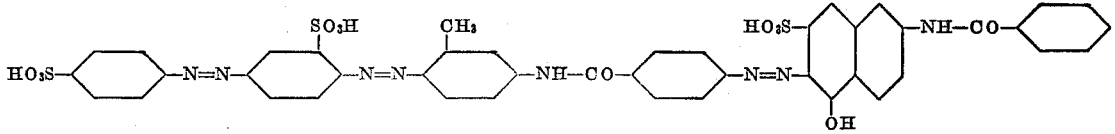

and is a red powder which dissolves in water with a red coloration and in concentrated sulfuric acid with a blue coloration. It dyes cotton and fibers of regenerated cellulose in yellowish-red shades which have good fastness to light and are dischargeable.

EXAMPLE 2

60.8 parts of the aminodisazo compound, obtained by the acid coupling of diazotized 4-amino-1,1'-azobenzene-3,4'-disulfonic acid with 1-amino-3-methylbenzene, condensing the resulting aminodisazo compound with 3-methyl-4-nitrobenzoyl chloride, and then reducing the nitro group to the amino group, are dissolved in 750 parts of water adjusted to neutrality by the addition of sodium carbonate. 7 parts of sodium nitrite are added to the resulting solution, and this is slowly introduced into a mixture of 45 parts of 30% hydrochloric acid, 120 parts of ice and 30 parts of water in such manner that the final temperature of the mixture is 5–10°. When the diazotization is finished, the diazo suspension obtained is allowed to flow within 45 minutes into a neutral warm solution, at 40°, of 37.2 parts of 2-(3'-methyl-4'-amino)-benzoylamino-5-hydroxynaphthalene-7-sulfonic acid and 4 parts of sodium hydroxide in 400 parts of water. At the same time there is added to the coupling mixture sufficient sodium carbonate to maintain the pH constant at between 6 and 7. When the coupling is finished, the solution containing the formed trisazo dyestuff is heated to 70°, the dyestuff is salted out, is filtered and then is dried.

The new trisazo dyestuff corresponds to the formula

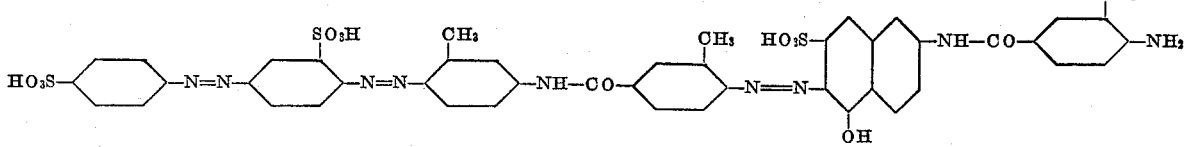

EXAMPLE 1

59.4 parts of the aminobenzoylaminodisazo compound, obtained by the acid coupling of diazotized 4-amino-1,1'-azobenzene-3,4'-disulfonic acid with 1-amino-3-methylbenzene, condensing the resulting aminodisazo compound with 4-nitrobenzoyl chloride, and then reducing the nitro group to the amino group, are dissolved in 600 parts of water adjusted to neutrality by the addition of sodium hydroxide. 7 parts of sodium nitrite are added to the resulting solution, and this is slowly introduced into a mixture of 45 parts of 30% hydrochloric acid and 100 parts of ice in such manner that the final temperature of the mixture is 5–10°. When the diazotization is finished, which is the case after 4–6 hours, the diazo suspension is allowed to flow within 30 minutes at 20° into a neutral solution of 34.3 parts of 2-benzoylamino-5-hydroxynaphthalene-7-sulfonic acid and 4 parts of sodium hydroxide in 300 parts of water. At the same time, there is added to the coupling mixture sufficient sodium bicarbonate to maintain the pH of the solution constant at and is a dark red powder which dissolves in water with a red coloration and in concentrated sulfuric acid with a blue coloration. It dyes cotton and fibers of regenerated cellulose in scarlet red shades. By diazotizing on the fiber and developing with 2-hydroxynaphthalene, the shade of dyeing is but slightly changed. The developed dyeings have very good fastness to washing and light, and moreover are particularly well dischargeable.

The table which follows gives further trisazo dyestuffs which likewise may be obtained as described in Examples 1 and 2. They are characterized by The aminoazo compounds (II) in column (A),
The nitrobenzenecarboxylic acid halides (III) in column (B), and
The hydroxynaphthalenesulfonic acids used as azo components in column (C).

In column (D) is given the type of trisazo dyeing used, and in column (E) the shade of dyeing on cotton given by the trisazo dyestuffs and/or developed on the fiber by diazotizing the same and coupling with 2-hydroxynaphthalene.

Table

| Example No. | (A) | (B) | (C) | (D) | (E) |
|---|---|---|---|---|---|
| 3 | 4 - amino - 1,1' - azobenzene - 3,4'- disulfonic acid ⟶ 1-amino - 2 - methoxy - 5 - methylbenzene. | 3-nitrobenzoyl chloride. | 2 - acetylamino - 5 - hydroxy - naphthalene-7-sulfonic acid. | Direct dyestuff. | reddish orange. |
| 4 | 4 - amino - 1,1' - azo - benzene - 3,4'-disulfonic acid ⟶ 1-amino-2,5-dimethylbenzene. | 4-nitrobenzoyl chloride. | 2 - cinnamoylamino - 5 - hydroxy-naphthalene - 7 - sulfonic acid. | ___do___ | scarlet red. |
| 5 | 4 - amino - 1,1' - azobenzene - 3,4'- disulfonic acid ⟶ aminobenzene. | 3-chloro-4-nitrobenzoyl chloride. | 2 - benzoylamino - 8 - hydroxy-naphthalene-6-sulfonic acid. | ___do___ | bluish red. |
| 6 | 4 - amino - 1,1' - azobenzene - 3,4'- disulfonic acid ⟶ 1 - a-mino-3-acetylamino-benzene. | 4-nitrobenzoyl bromide. | 2 - hydroxynaphthalene - 6 - sulfonic acid. | ___do___ | yellowish red. |
| 7 | 4 - amino - 1,1' - azobenzene - 3,4'- disulfonic acid ⟶ 1 - a-mino-2,5-dimethylbenzene. | 3-nitro-4-ethoxybenzoyl chloride. | 1 - hydroxynaphthalene - 3 - sulfonic acid. | ___do___ | Do. |
| 8 | 4 - amino - 1,1' - azobenzene - 3,4'- disulfonic acid ⟶ 1 - a-mino-3-methylbenzene. | 4-nitrobenzoyl chloride. | 1 - hydroxynaphthalene - 3,6 - disulfonic acid. | ___do___ | scarlet red. |
| 9 | ___do___ | ___do___ | 2 - crotonylamino - 8 - hydroxynaphthalene - 6 - sulfonic acid. | ___do___ | bluish red. |
| 10 | ___do___ | ___do___ | 2 - (4' - amino) - benzoylamino - 5 - hydroxynaphthalene - 7 - sulfonic acid. | Developed dyestuff. | scarlet red. |
| 11 | ___do___ | 3 - nitro - 4 - methoxybenzoyl chloride. | 2 - (3' - amino - 4' - methoxy) - benzoylamino - 5 - hydroxy-naphthalene-7-sulfonic acid. | ___do___ | Do. |
| 12 | ___do___ | 4-nitrobenzoyl chloride. | 2 - (4' - amino) - benzoylamino - 8 - hydroxynaphthalene - 6 - sulfonic acid. | ___do___ | bluish red. |
| 13 | ___do___ | ___do___ | 2-carbomethoxy - amino - 5 - hydroxynaphthalene - 7 - sulfonic acid. | Direct dyestuff. | yellowish red. |
| 14 | ___do___ | ___do___ | 2 - carbo - (2' - ethoxy) - ethoxyamino - 5 - hydroxynaphthalene-7-sulfonic acid. | ___do___ | Do. |
| 15 | ___do___ | 3-nitrobenzoyl bromide. | 5 - hydroxy - 7 - sulfonaphthalene - 2 - carbaminic acid - (4'-acetylamino)-phenylamide. | ___do___ | reddish orange. |
| 16 | 4 - amino - 1,1' - azobenzene - 3,4'- disulfonic acid ⟶ 1 - a-mino-2,5-dimethylbenzene. | 3 - methyl - 4 - nitrobenzoyl chloride. | 2 - (4' - amino) - benzoylamino-5-hydroxynaphthalene-7-sulfonic acid. | Developed dyestuff. | scarlet red. |
| 17 | 4 - amino - 1,1' - azobenzene - 3,4'- disulfonic acid ⟶ 1 - amino - 2 - methoxy - 5 - methylbenzene. | 4-nitrobenzoyl chloride. | 2 - (3' - amino) - benzoylamino-5-hydroxynaphthalene-7-sulfonic acid. | ___do___ | Do. |
| 18 | ___do___ | 3 - bromo - 4 - nitro - benzoyl chloride. | 2 - (3' - methyl - 4' - amino) - benzoylamino - 5 - hydroxynaphthalene-7-sulfonic acid. | ___do___ | bluish red. |
| 19 | 1-aminobenzene-4-sulfonic acid ⟶ 1 - aminonaphthalene-6-sulfonic acid ⟶ 1-amino-3-methylbenzene. | 4-nitrobenzoyl chloride. | 2 - propionylamino - 5 - hydroxynaphthalene-7-sulfonic acid. | Direct dyestuff. | red. |
| 20 | ___do___ | ___do___ | 2 - (4' - amino) - benzoylamino-5-hydroxynaphthalene-7-sulfonic acid. | ___do___ | bluish red. |
| 21 | ___do___ | ___do___ | 1 - hydroxynaphthalene - 4 - sulfonic acid. | ___do___ | red. |
| 22 | 1-aminobenzene-4-sulfonic acid ⟶ 1-aminonaphthalene-7-sulfonic acid ⟶ 1-amino - 2 - methoxy - 5 - methylbenzene. | 3 - ethyl - 4 - nitrobenzoyl chloride. | 2-cinnamoylamino-8-hydroxynaphthalene-6-sulfonic acid. | ___do___ | brownish red. |
| 23 | 1-aminobenzene-2,5-disulfonic acid ⟶ 1-aminonaphthalene ⟶ 1-amino-3-methylbenzene. | 4-nitrobenzoyl chloride. | 2 - hydroxynaphthalene - 8 - sulfonic acid. | ___do___ | red. |
| 24 | 1-amino - 2,4 - dimethylbenzene-6-sulfonic acid ⟶ 1-aminonaphthalene-6-sulfonic acid ⟶ 1-amino-3-methylbenzene. | ___do___ | 2 - benzoylamino - 5 - hydroxynaphthalene-7-sulfonic acid. | ___do___ | Do. |
| 25 | 1 - amino - 2 - chlorobenzene - 4 - sulfonic acid ⟶ 1-aminonaphthalene-6-sulfonic acid ⟶ 1-amino-2-methoxy-5-methylbenzene. | ___do___ | 2 - (4' - methyl) - benzoylamino-5 - hydroxynaphthalene-7-sulfonic acid. | ___do___ | brownish red. |
| 26 | 2 - aminonaphthalene - 6,8 - disulfonic acid ⟶ aminobenzene ⟶ 1-amino-3-methylbenzene. | ___do___ | 2 - hydroxynaphthalene - 3,6 - disulfonic acid. | ___do___ | scarlet red. |
| 27 | 2-aminonaphthalene - 6,8 - disulfonic acid ⟶ 1-amino-3-methylbenzene ⟶ 1-amino-3-methylbenzene. | 3-nitrobenzoyl chloride. | 2 - crotonylamino - 5 - hydroxynaphthalene-7-sulfonic acid. | ___do___ | yellowish red. |
| 28 | ___do___ | 4-nitrobenzoyl chloride. | 2 - (4' - amino) - benzoylamino-5-hydroxynaphthalene - 7 - sulfonic acid. | Developed dyestuff. | scarlet red. |
| 29 | 2-aminonaphthalene - 6,8 - disulfonic acid ⟶ 1-amino-2 - methoxy - 5 - methylbenzene ⟶ 1-amino-3-methylbenzene. | 3 - methoxy - 4 - nitrobenzoyl chloride. | 2-(3'-methoxy - 4' - amino) - benzoylamino - 5 - hydroxynaphthalene-7-sulfonic acid. | ___do___ | bluish red. |
| 30 | 2-aminonaphthalene - 4,8 - disulfonic acid ⟶ 1-amino-3-methylbenzene ⟶ 1-amino-3-methylbenzene. | 4-nitrobenzoyl chloride. | 8-hydroxy-6-sulfonaphthalene- 2-carbaminic acid-(4'-acetylamino)-phenylamide. | Direct dyestuff. | red. |

Following are the formulae of representative dyestuffs of the foregoing table:

Example 5

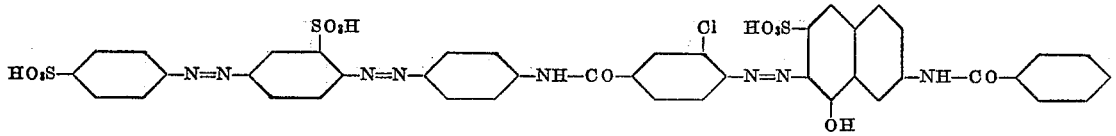

Example 10

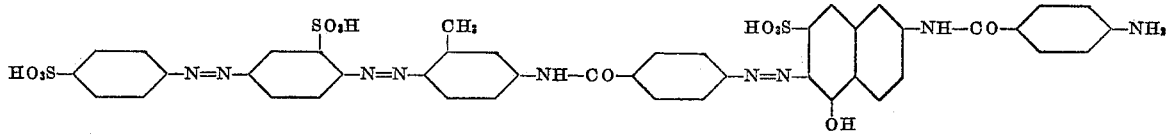

Example 27

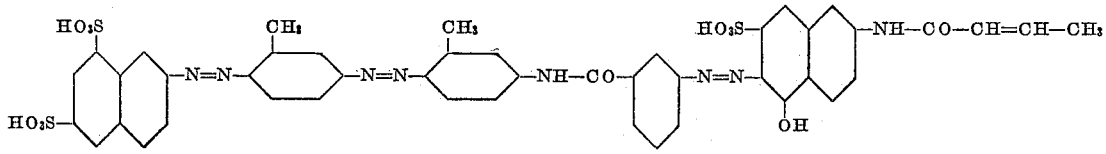

EXAMPLE 31

100 parts of cotton are introduced into a dyebath comprising 0.5 part of the trisazo dyestuff obtained according to Example 1, and 1 part of anhydrous sodium carbonate. The dyebath is slowly brought to the boil, then 20 parts of anhydrous sodium sulfate are added and the bath slowly cooled to about 70°. The dyed cotton is well rinsed with cold water and then dried.

EXAMPLE 32

100 parts of cotton are dyed as described in the foregoing example with 0.5 part of the trisazo dyestuff obtained according to Example 2. The well-rinsed dyed material is treated in a cold bath with 2 parts of sodium nitrite and 5 parts of concentrated hydrochloric acid, again rinsed for a short while with cold water and then introduced into a cold developing bath containing 1 part of 2-hydroxynaphthalene dissolved by means of 1 part of aqueous 30% sodium hydroxide solution. The dyed material is digested for ½ hour in the developing bath, after which it is thoroughly rinsed and finally dried.

Having thus disclosed the invention, what is claimed is:

1. A polyazo dyestuff which corresponds to the formula

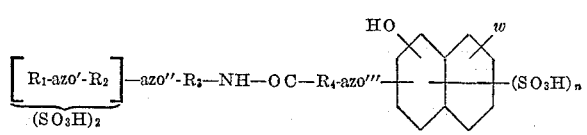

wherein each of $R_1$ and $R_2$ stands for a member selected from the group consisting of substituted and unsubstituted radicals of the benzene and naphthalene series, the substituents being chosen from the class consisting of chlorine atoms, lower alkyl, lower alkoxy and sulfonic acid groups, $R_3$ stands for a member selected from the group consisting of substituted and unsubstituted radicals of the benzene series, the substituents being chosen from the class consisting of lower alkyl, lower alkoxy and acylamino groups, the acyl group being carboxylic acid acyl, $R_4$ stands for a member selected from the group consisting of substituted and unsubstituted radicals of the benzene series, the substituents being chosen from the class consisting of chlorine and bromine atoms, lower alkyl and lower alkoxy groups, $w$ stands for an acylamino group, the acyl group being carboxylic acid acyl, $n$ stands for one of the numerals 1 and 2, and wherein —azo"— is linked in para-position with respect to -azo'- and to -NH-CO-, and wherein —azo'''— is linked in ortho-position with respect to —OH and is linked in one of the para- and meta-positions with respect to —NH—CO—.

2. The polyazo dyestuff which corresponds to the formula

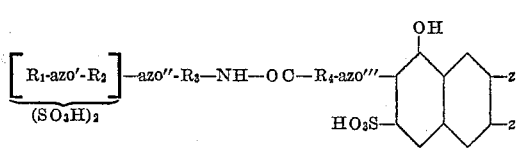

wherein each of $R_1$ and $R_2$ stands for a member selected from the group consisting of substituted and unsubstituted radicals of the benzene and the naphthalene series, the substituents being chosen from the class consisting of chlorine atoms, lower alkyl, lower alkoxy and sulfonic acid groups, $R_3$ stands for a member selected from the group consisting of substituted and unsubstituted radicals of the benzene series, the substituents being chosen from the class consisting of lower alkyl, lower alkoxy and acylamino groups, the acyl group being carboxylic acid acyl, $R_4$ stands for a member selected from the group consisting of substituted and unsubstituted radicals of the benzene series, the substituents being chosen from the class consisting of chlorine and bromine atoms, lower alkyl and lower alkoxy groups, one $z$ stands for a hydrogen atom, and the other $z$ stands for an acylamino group, the acyl group being carboxylic acid acyl, and wherein —azo"— is linked in para-position with respect to —azo'— and to —NH—CO—, and wherein —azo'''— is linked in one of the para- and meta-positions with respect to —NH—CO—.

3. The polyazo dyestuff which corresponds to the formula

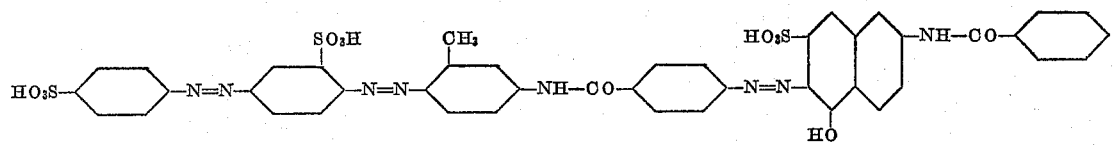

4. The polyazo dyestuff which corresponds to the formula

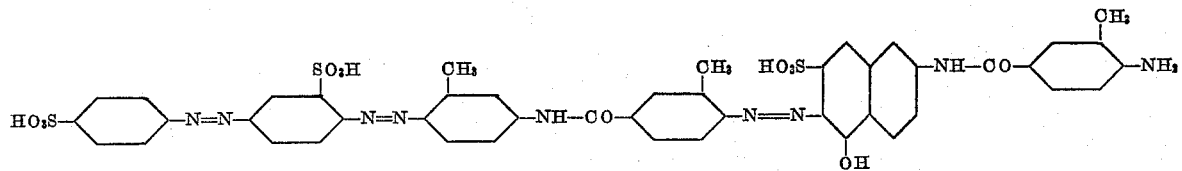

5. The polyazo dyestuff which corresponds to the formula

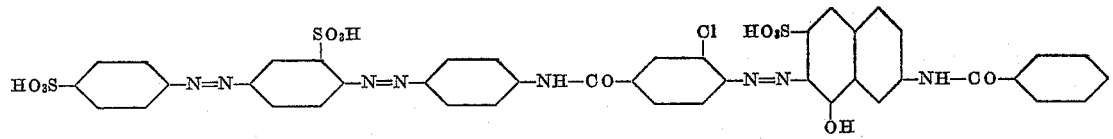

6. The polyazo dyestuff which corresponds to the formula

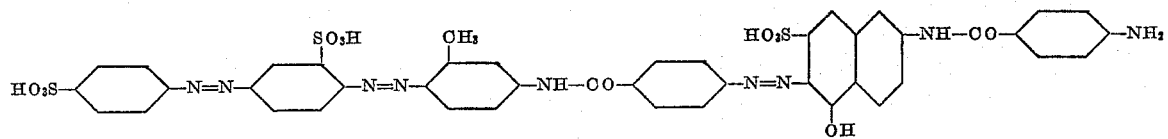

7. The polyazo dyestuff which corresponds to the formula

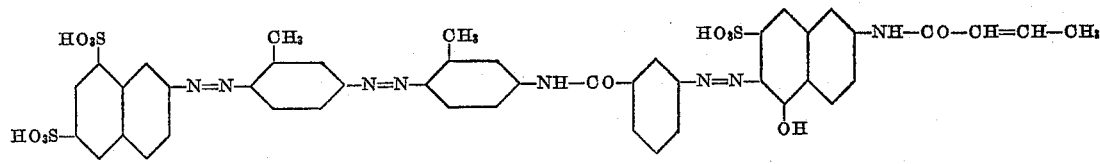

References Cited in the file of this patent
UNITED STATES PATENTS
2,659,721   Bossard et al. _____ Nov. 17, 1953
FOREIGN PATENTS
292,086   Switzerland _____ Oct. 16, 1953